US 9,112,927 B2

(12) United States Patent
Takahashi et al.

(10) Patent No.: US 9,112,927 B2
(45) Date of Patent: Aug. 18, 2015

(54) NETWORK SYSTEM AND COMMUNICATION DEVICE

(71) Applicant: Hitachi, Ltd., Tokyo (JP)

(72) Inventors: Kiyotaka Takahashi, Okegawa (JP); Yoshihiro Ashi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 344 days.

(21) Appl. No.: 13/676,638

(22) Filed: Nov. 14, 2012

(65) Prior Publication Data

US 2013/0315251 A1 Nov. 28, 2013

(30) Foreign Application Priority Data

Nov. 15, 2011 (JP) ................................. 2011-249200

(51) Int. Cl.
*H04L 12/28* (2006.01)
*H04L 29/08* (2006.01)
*H04L 29/06* (2006.01)

(52) U.S. Cl.
CPC .............. *H04L 69/324* (2013.01); *H04L 69/28* (2013.01)

(58) Field of Classification Search
None
See application file for complete search history.

(56) References Cited

U.S. PATENT DOCUMENTS

| 7,180,896 | B1 * | 2/2007 | Okumura ...................... 370/394 |
| 2007/0257786 | A1 * | 11/2007 | King et al. ..................... 340/503 |
| 2011/0276826 | A1 * | 11/2011 | Schoppmeier et al. ......... 714/16 |

FOREIGN PATENT DOCUMENTS

JP 11-259386 9/1999

* cited by examiner

*Primary Examiner* — Andrew Lai
*Assistant Examiner* — Jamaal Henson
(74) *Attorney, Agent, or Firm* — Foley & Lardner LLP

(57) ABSTRACT

A communication device on a time equivalence assurance network that guarantees the receiving sequence of packets sent to all users so that even if a user session is re-sent, a function operates to alleviate the resultant effects and make the send and receive timing approach the initial timing. An edge communication device on a provider network identifies the sessions of each user subscriber terminal, and stores and monitors the time information attached by a sequence information attachment function. Even if a packet is resent, the packet will at this time be resent with attached sequence information based on the past time originally attached to the packet, and not sequence information based on the current resending time.

15 Claims, 12 Drawing Sheets

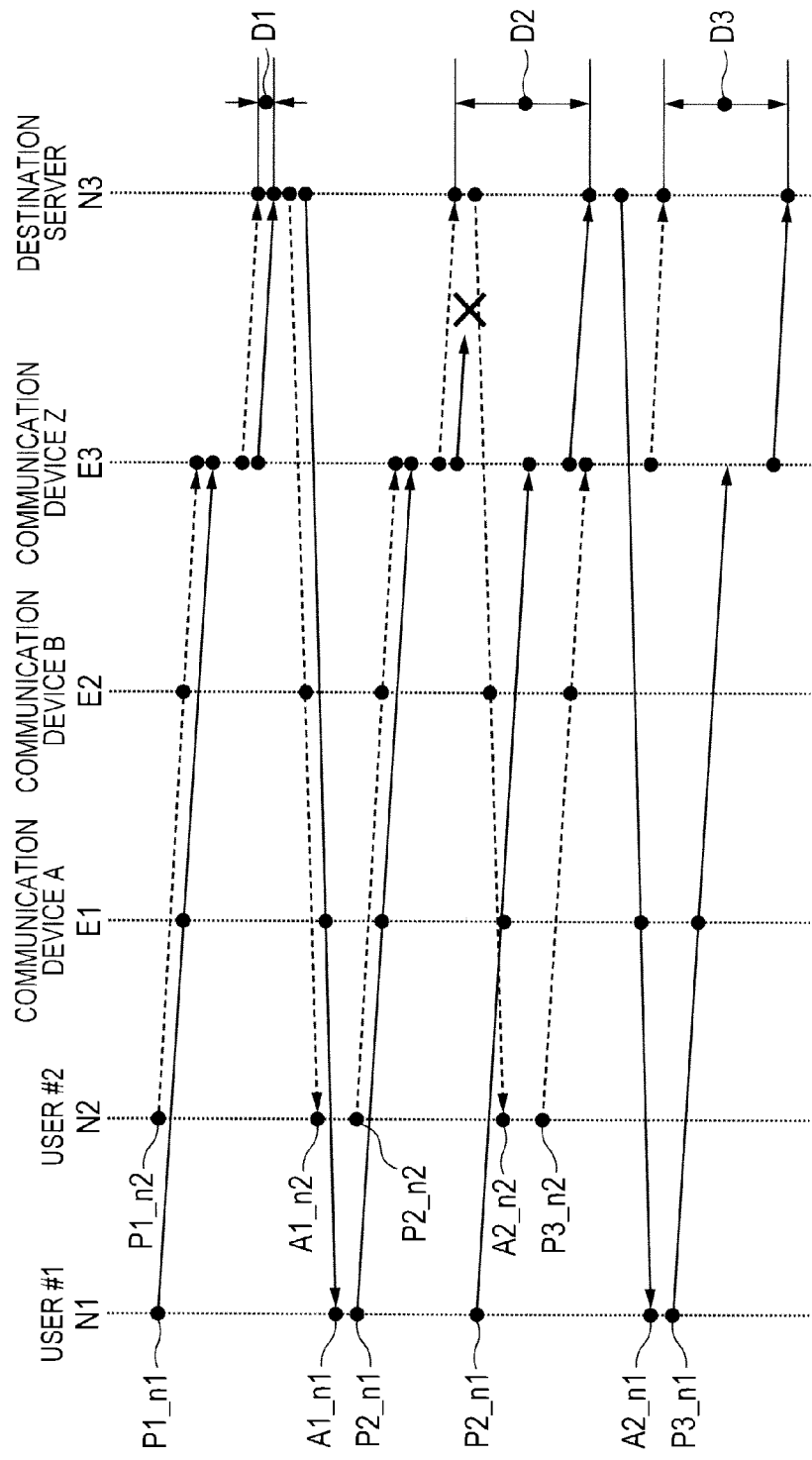

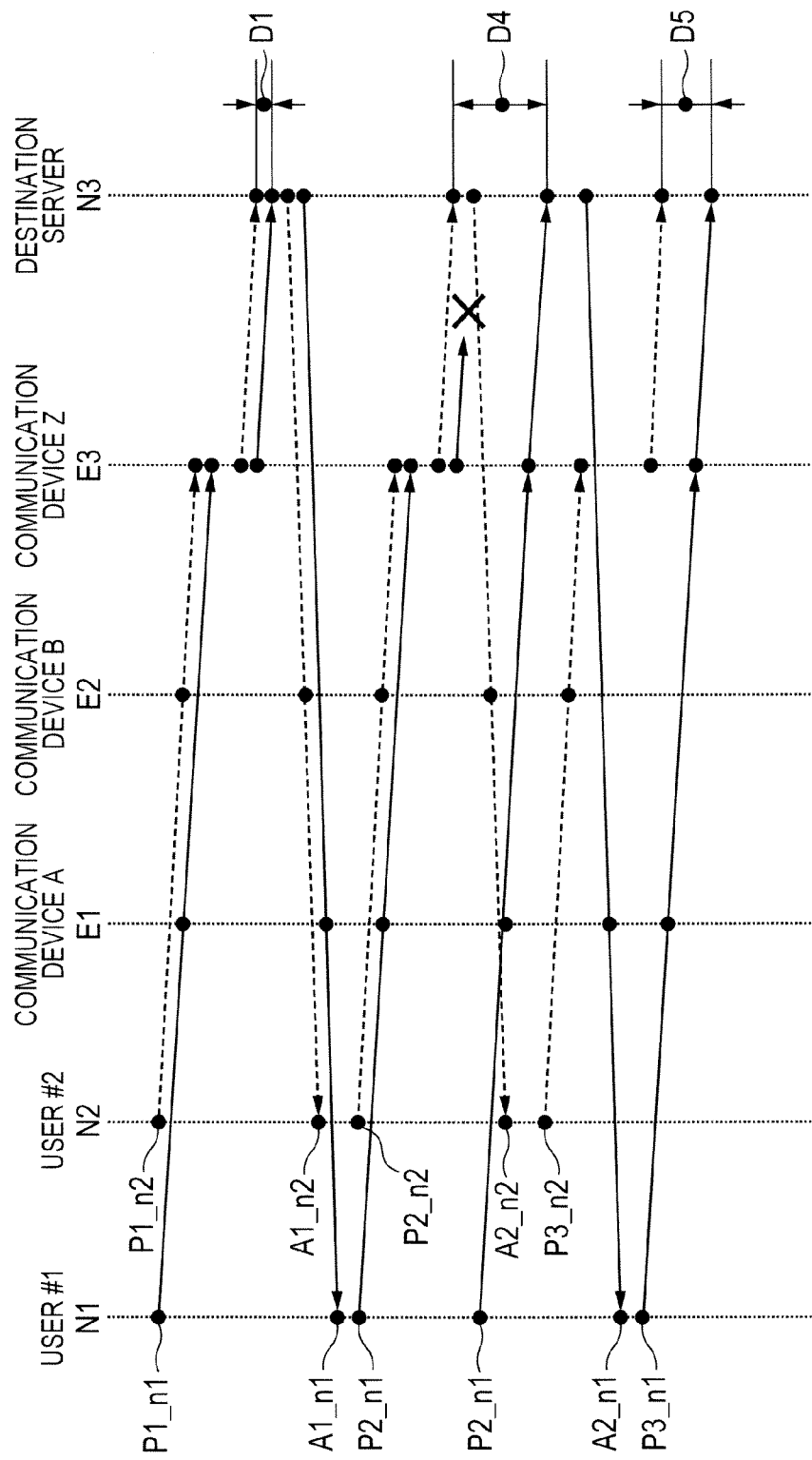

NETWORK SYSTEM AND COMMUNICATION DEVICE

CLAIM OF PRIORITY

The present application claims priority from Japanese patent application JP 2011-249200 filed on Nov. 15, 2011, the content of which is hereby incorporated by reference into this application.

FIELD OF THE INVENTION

The present invention relates to a network system and communications device for ensuring the input and output sequence of packets over a network.

BACKGROUND OF THE INVENTION

In communication services currently provided by communication providers the sequence that packets from plural users at geographically separate locations sent to the same destination enter the service provider network and the sequence that packets at the destination exit the network are not always equal due to transmission delays occurring due to the physical distance between the user and destination or between users.

So in the case of transactions (electronic commerce transactions such as the buying and selling of stocks and currencies over a network) whose results are determined by the sequence that the transaction is processed, even a slight time discrepancy caused due to the transmission delay generates a profit or loss between the parties involved so that fair and equal service to the users cannot be maintained.

In other words, if the processing request is transferred and executed by way of the network, the processing request sent to the network will be received and executed at the applicable server after a transmission delay that varies according to factors such as the physical distance to the server doing the processing. So in other words the sequence that the process request is received and executed depends not only on the transmit sequence but also on the transmission delay time that occurs in this communication process. One method to resolve this problem is to attach a timestamp to the processing request from the user and then rearrange the (request) sequence at the server processing the transactions.

In Japanese Unexamined Patent Application Publication NO. Hei11 (1999)-259386, the server for performing the transaction contains a function to time-synchronize with the terminal utilized by the user and attach a timestamp to the processing request the user sent from the terminal. This server processes the processing requests in the order that the requests were sent, arraying the request sequences based on the timestamp attached to the processing request rather than the sequence in which the processing request was received. This operation is described below in more detail.

The client machine periodically receives the absolute time from the time server, and corrects the time on the timer of the client machine by utilizing the received absolute time. Each client machine sends a service data request and time data (absolute time) from the timer for receiving various services to the server machine byway of the Internet. The control unit in the server machine sorts the service data requests stored in sequence in the memory device in the order of earliest absolute time, based on the time data (absolute data) attached to the service data request. The server machine also contains a timer to count the time from the time that the service data request from each client machine arrived at the control unit. The server machine sets the maximum transmission time between the server machine and each client machine as the maximum delay time, and utilizing the timer contained within the server machine, processes the service data request after storing the maximum delay time among the service data request in the storage device.

SUMMARY OF THE INVENTION

However in the Japanese Unexamined Patent Application Publication NO. Hei11 (1999)-259386, the function for handling time stamps is executed by a service request program operated by the client machine, and by a service processing program operated by the server machine. This applicable function must be fabricated into each service, as a portion of the services provided by the server, and as a portion of the functions utilizing the client machine services. In other words, usage of the function is limited to just those services that were provided in advance with this applicable function. Consequently, users or service providers wanting to utilize the applicable function needed to contrive a dedicated service containing this applicable function for use with each service. The function for handling timestamps in Japanese Unexamined Patent Application Publication NO. Hei11 (1999)-259386 operates at the client machine or namely a location capable of being accessed for example by the terminal user, so that a user with bad intent might possibly falsify timestamp information to guarantee an equal status among the users.

An object of the present invention is to provide a network system and a communication device capable of providing assured time equivalence service to a plurality of geographically separated users and further capable of preventing false representation by a user with bad intent.

Another object of the present invention is to provide a network system and a communication device capable of making corrections when the resending of a user session creates a continuous unfavorable situation in another user's session.

To achieve the aforementioned objective, in the present invention as a network system including a network to couple plural communication devices; a communication device for receiving packets from outside the network attaches sequence information taken in time synchronization with other communication devices to the packet; and a communication device for sending packets to outside the network arrays and sends the packet based on the sequence information attached to the packet; and when the resending of a packet occurs, the communication device for receiving packets from outside the network, attaches the sequence information based on the past time information already attached to the applicable packet and resends the applicable packet.

To also achieve the aforementioned objective, the present invention as a communication device mutually coupled within a network; and includes: an input processor unit to receive packets from outside the network and attach sequence information taken in time synchronization with other communication devices to the packet; and an output processor unit to array and send the packet to outside the network based on the sequence information attached to the packet by another communication device; and in which the input processor unit attaches the sequence information and resends the applicable packet based on the past time information already attached to the applicable packet when the resending of a packet occurs.

The present invention is capable of providing time equivalence assurance to all users connected to the network; and capable of guaranteeing time equivalence or namely time fairness among the users without requiring that the service provider or user change the desired service.

The invention is further capable of expanding the applicable service to maintain time equivalence assurance, even if the packet resend function contained in the user terminal or server operates due to functions to make falsifying of time information by an unscrupulous user and so on impossible.

BRIEF DESCRIPTION OF THE DRAWINGS

FIG. 8B is a timing chart showing the case where there is no function relating to resending in the example where the network provides time equivalence in the first embodiment;

FIG. 8C is a timing chart showing the case where there is a function relating to resending in the example where the network provides time equivalence in the first embodiment;

DETAILED DESCRIPTION OF THE PREFERRED EMBODIMENTS

Figure 1:
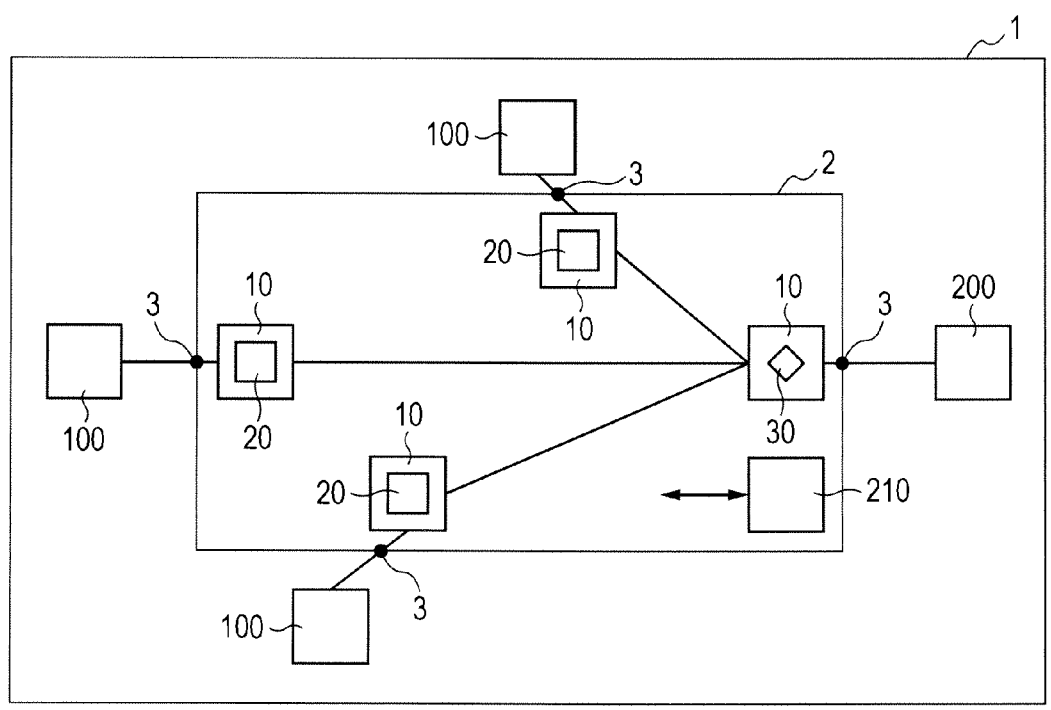
FIG. 1 is a drawing for describing the relation between the responsible control range and the function installation position of the equipment in the first embodiment.

The embodiments of the present invention are hereafter described in order according to the drawings.
First Embodiment FIG. 1 is a drawing for describing the relation between the responsible control range and the function installation position of the equipment in the first embodiment. In the same figure, 1 denotes the subscriber responsible control range, 2 denotes the service provider's responsible control range, and 3 denotes the POI (point of interface). This POI 3 shows the responsible control divider boundary in the network divided into a subscriber responsible control range 1 and a service provider responsible control range 2. In the specifications of the present invention, the network within the service provider responsible control range 2 is sometimes called the provider network.

The network system of the present embodiment as shown in the same figure is comprised of a subscriber terminal 100, a destination server 200 for providing services utilized from the subscriber terminal, and a communication device 10 utilized by the service provider to provide the communications services. The configuration of the present embodiment is applicable to a communication device managed by the service provider and installed within the subscriber's home such as in a home gateway or in a communication device such as the multiprotocol label switching-transport profile (MPLS-TP) device managed by the service provider and installed in the office building of the service provider.

In the above Japanese Unexamined Patent Application Publication NO. Hei11(1999)-259386 the applicable patent technology is applied to a client machine managed by the subscriber and a server machine managed by the service provider and does not involve the service provider who provides network functions. However the configuration of the communication device of the present embodiment applies to a communication device managed by the service provider. This embodiment is featured by the point that the subscriber and the service provider only utilize the communication service guaranteeing time equivalence within the provider network provided by the service provider and adding and running any function to one's own communication device is not necessary.

In FIG. 1, the subscriber uses the service provided by the destination server 200, by way of the subscriber terminal 100 that communicates with the destination server 200 via the service provider's communication device 10 by utilizing the communication service provided by the service provider. The responsible control range 2 of the service provider or namely all of the communication devices 10 within the provider network 2 are controlled by use of the control signal 220 from the administrator terminal 210 of the service provider managing those devices.

The service provider's communication device 10 connected to the subscriber terminal 100 utilizes for the time, as a unique identifier attached to the packet received from the subscriber in the provider network 2. The communication device 10 therefore contains a function for synchronizing the time with the communication device within the network by utilizing a time acquisition function such as a GPS (Global Positioning System) or a time synchronizing function such as IEEE1588v2 or NTP (Network Time Protocol).

The communication device 10 of the service provider connected to the subscriber terminal 100 contains a sequence information attachment function 20 showing the network sequence for accepting the packet received from the subscriber. The sequence information includes time information held in the communication device 10 and acquired from a clock that is time-synchronized with other communication devices 10.

When the subscriber terminal 100 has resent a packet due to some type of fault in communications between the subscriber terminal 100 and the destination server 200; this sequence information attachment function 20 of the communication device 10 includes a function to reattach the past sequence information applied at the time the initial packet corresponding to the resent packet from the subscriber terminal 100 was received, rather than attaching a time information for the time that the resent packet was received. This sequence information attachment function 20 also continues to attach the applicable sequence information only in a specified period after resending, based on the rules established by the service provider for packets sent by the applicable subscriber terminal 100. The communication device 10 includes a function to delete the applicable sequence information retained within the device, after this fixed period has elapsed.

In communication devices possessing a high-speed network interface, the plurality of packets accepted from the subscriber are estimated within the identical time shown by the clock retained in the communication device. The above described sequence information can even be configured from time information and attachment information for use as reference information to refer to when arraying this type of packet in the received sequence. This attachment information corresponds to the sequence numbers (i.e. 0, 1, 2 . . . ), the cumulative received byte counts at the applicable port within the identical time (e.g. 0, 64, 128, . . . ), the hardware (HW) clock count value, and optional integers set in each device, etc.

The sequence number is the simplest scheme for identifying the order within the same device. The cumulative received byte count can indicate a relative position between the minimal unit marks on the clock, when packets are input at the wire rate to the network interface. The HW clock count utilizes a finer or more accurate HW clock value than the minimal unit marks on the clock and so can show the relative position with finer accuracy than when adapting to the cumulative receive byte count. The optional integer value is effective for allocating the priority order in advance to each communication device. In this case, the order among communication devices can be determined with the optional integer value and the order within each communication device can be determined by the sequence number, by combining the optional integer value with the sequence number. If a network is configured in particular by identical communication devices then one can assume each communication device operates on the same frequency, so that when arraying packets having sequence information showing plural identical times sent from plural transmission sources then simple installation and high accuracy can be achieved by utilizing an HW clock value as the attachment information.

In the present embodiment, the communication device 10 of the service provider connected to the subscriber terminal 100 contains a function to delay the sending of packets received from the subscriber into the network just by an optional time specified beforehand. The applicable delaying function allows using up the delay time, which is essentially in the communication device 10 on the service provider service provider side connected to the destination server 200, within the subscriber side communications device. The communication device 10 on the service provider side connected to the destination server communicating with the numerous subscriber terminals requires a buffer in order to temporarily place all packets assumed received from the subscriber terminal in standby during the appropriate waiting time required due to transmission delays in the network. However, the applicable delay function on the subscriber side of the communication device can shorten the appropriate waiting time on the service provider side of the communication device and in that way allows reducing the buffer quantity held by the applicable communication device.

The communication device 10 on the subscriber side of the service provider connected to the subscriber terminal 100 contains a function to invalidate the existing sequence information if information such as sequence numbers (this is called "existing sequence information" for distinguishing from the sequence information in the provider network) was already attached to the packets received from subscribers.

The invalidating function in the communication device 10 on the input side of this provider network may include methods; such as setting a bit into the invalid flag field retained by the existing sequence information, attaching unique network sequence information that is added unrelated to the existing sequence information, and discarding the packet itself since the existing sequence information containing past time information might be a false sequence. Moreover, if the existing sequence information shows future times, then this is judged an instruction to the transmit hold function to pause the transmission until the specified time at the network output side and then pass the packet unchanged at the network input side, and totally rewrite the current values in order to prevent falsifying the existing sequence information, or totally discarding the packet to prevent falsification regardless of the values in the existing sequence information.

However, a service provider communication device 10 connected to the destination server 200 includes a packet array send function 30 to delay the sending of packets to identical destinations by just an optional time set in advance; and after arraying the packets with the sequence information attached to the packet in the sequence information attachment function 20 of the communication device on the network input side, then sends the packet to the destination. The time information within the sequence information shows the time that the network accepted the packet so that the communication device 10 on the output side at this time sends the packets in the order of oldest time. The packet array send function 30 uses this sequence information to send the applicable packets at the timing received, in accordance with the sequence the packet was accepted.

In the present embodiment, the service provider communication device 10 connected to the destination server 200 contains a function to skip the array processing in the applicable communication device and send the packet to the destination server 200 in cases where the time shown on the sequence information attached to the packet to send to the destination server 200 was attached with a time further in the past than the time tracing back just from the current time to an optional time set beforehand, and judged that the applicable packet is a resent packet or was sent from the subscriber terminal 100 since the resending occurred, and attached with past sequence information.

The packet array send function 30 of the service provider communication device 10 connected to the destination server 200 includes a function to decide the positional relation of the sequence information in the packet array send function 30 from the sequence information. The positional relation of the sequence information is determined by the positional relation of the time information within the sequence information. Moreover the positional relation of the sequence information can be determined from the positional relation of the time information and attached information taking into account the arrival of plural packets within an identical time. This attached information is values in fields indicating the order of priority within the packet or is the sequence number, or may be both. Checking the field showing the order of priority among the packets allows regulating the array sequence according to the order of priority attached to the subscriber or service provider, rather than just the sequence that the packet was accepted into the network. Fields indicating the order of priority among the packets may include the TC (Traffic Class) field of the MPLS, the CoS (Class of Service) field for VLAN (Virtual LAN) tags, and ToS (Type of Service) fields within the IP (Internet Protocol) packet, etc.

The packet array send function 30 of the service provider's communication device 10 connected to the destination server 200 attempts to array the packets according to the sequence information attached to the packet. However, in cases where storing plural packets all holding absolutely identical sequence information, the packet array send function 30 has a function to select the first packet to send from among these packets. This function may utilize methods such as a sequence decision method for cases where the sequence information is a complete match; a method that complies with the array sequence within the buffer such as by receive queues to retain the packets received from the communication device 10 that arrays the packets, and a random selection method. These random selection methods may include using an index to specify entries within the receive queues by utilizing random numbers.

As described above, the service provider's communication device 10 connected to the destination server 200, contains a packet array send function to delay the sending of a packet to outside the network until the time shown on the time information within the sequence information. The applicable function is capable of distributing the information from the network to the destination at the specified time.

The service provider's communication device 10 connected to the destination server 200 contains a function to invalidate the sequence information attached by the network to a packet to send from the network to the destination server 200, and to validate sequence information that was invalidated by the network side communication device 10 to restore the status of the packet received by the network.

Figure 2:
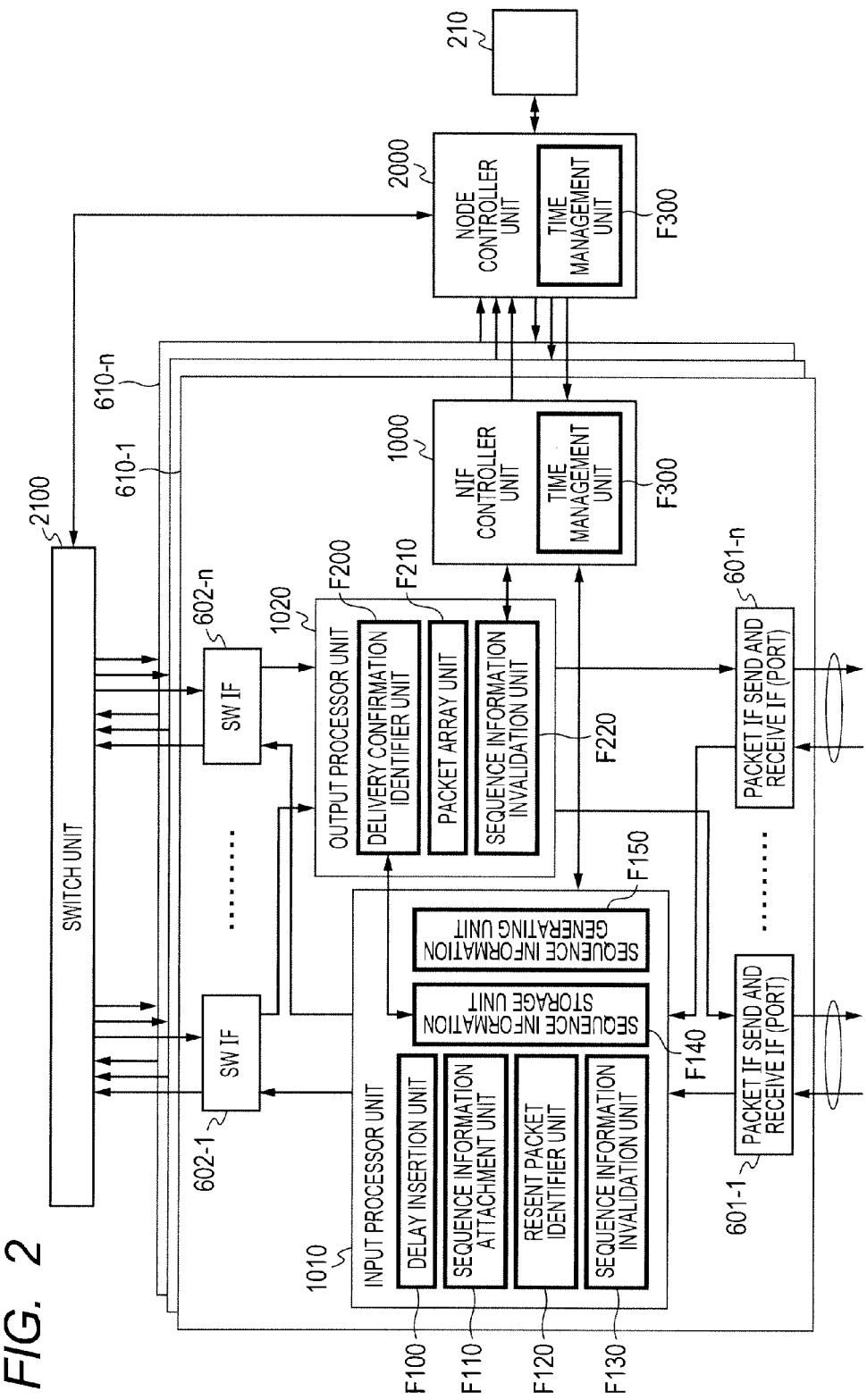
FIG. 2 is a drawing showing one example of the internal structure of the communication device of the first embodiment.

FIG. 2 is a drawing showing one example of the internal structure of the communication device 10 within the provider network 2 of the first embodiment shown in FIG. 1. The communication device 10 shown in this same figure is comprised of a node controller unit 200 to control the overall equipment, a plurality of network interfaces 610-1 through 610-n, and a switch unit 2100 to mutually connect the network interfaces. The administrator terminal 210 shown in FIG. 1 may of course also be positioned outside the communication device 10 as previously described.

Each of the network interfaces 610-1 through 610-n is comprised of packet send and receive IF ports 601-1 through 601-n, switch interfaces 602-1 through 602-n corresponding to each of the packet send-receive (IF) ports, an input processor unit 1010 for processing the packets received by way of the packet send-receive (IF) units, an output processor unit 1020 for performing the processing to send the packets by way of the packet send-receive (IF) units, and a network interface (Network Interface: NIF) controller unit 1000 for controlling the input processor unit 1010 and the output processor unit 1020. Each of the network interfaces 610-1 through 610-n possesses the usual computer configuration, including at least one CPU (Central Processing Unit) as the processor unit, a memory as the storage unit, and also the packet send and receive IF ports 601-1 through 601-n and the interfaces 602-1 through 602-n, etc. as described above. Each type of function described after the input processor unit 1010, the output processor unit 1020, and the NIF controller unit 1000 are implemented by a program executed using the CPU and memory.

A node controller unit 2000 on the other hand, provides a control network interface for the administrator of the communication device 10 in FIG. 2 and is capable of making different types of settings and operating the applicable device. The node controller unit 2000 also contains a processor unit and a storage device and also holds information for making initial settings for initializing the communication device.

During initializing of the applicable device, the node controller unit 2000 initializes each function within the communication device using the initial value setting information stored in the storage device or the default values possessed by the node controller unit 2000. The settings and operation of the device's node controller unit 2000 made by the administrator using the administrator terminal 210 are reflected as needed in the appropriate NIF controller unit 1000 among the network interfaces 610-1 through 610-n.

The node controller unit 2000 can in this way set the parameters held in each of the network interfaces 610-1 through 610-n as required by the administrator. The main parameters that are set from the node controller unit 2000 in the each of the network interfaces 610-1 through 610-n are as follows.

Actions (selecting to pass the packet after setting the invalidation flag, or packets for disposal, etc.) when sequence information was already attached to the packet from the subscriber by the sequence information invalidation unit F130;

Packet sending delay time to allow arraying by the packet array unit F210;

On/off of the invalidation function on the sequence information invalidation unit F220 to allow sending the packets to the destination without removing the sequence information;

Identification methods (Selecting SHA values, MD5 values, Ether frame FCS values, etc.) for identifying UDP communication packets among stored packets in the sequence information storage unit F140;

Deletion methods for packet information stored in the sequence information storage unit F140 (Selecting the sent packet count after resending during receiving of delivery confirmation packets) after the specified time elapses.

The input processor unit 1010 configuring the communication device 10 of the present embodiment as shown in FIG. 2 is comprised of a delay insertion unit F100, a sequence information attachment unit F110, a resent packet identifier unit F120, a sequence information invalidation unit F130, a sequence information storage unit F140, and a sequence information generating unit F150. As already described above, these functions can be implemented by a program executed by a processor unit such as a CPU configuring the input processor unit 1010.

These function blocks F100 through F150 configure a sequence number attachment function 20 showing the sequence in which packets received from the subscriber 100 listed in FIG. 1 are accepted into the network. The delay insertion unit F100 is a function to delay the sending of the packet received from the subscriber to within the network, just by an optional time specified in advance. The sequence information attachment unit F110 is a function to attach sequence information used for the time, as a unique identifier showing the sequence that the packet was received from the subscriber within the network. The attachment method is just as previously described. However, the sequence information attachment unit F110 determines resent packets in the resent packet identifier unit F120, and during the period that the array process bypass flag is set to on, acquires and attaches the sequence information corresponding to the applicable packet from among the sequence information monitored by the sequence information storage unit F140.

The resent packet identifier unit F120 is a function to decide whether or not the packet received from the subscriber is a resent packet and set the array process bypass flag to on if a resent packet. The sequence information invalidation unit F130 is a function to invalidate that sequence information when a sequence number was already attached to the packet received from the subscriber. The sequence information generating unit F150 is a function to generate sequence information used for the time, as a unique identifier showing the sequence that the packet was received from the subscriber. The sequence information generating unit F150 moreover includes a function for adding additional information for judging the sequences and generating sequence information later even in cases where plural packets were received at the same time.

The output processor unit 1020 in the communication device 10 of the present embodiment further includes a delivery confirmation identifier unit F200, a packet array unit F210, and a sequence information invalidation unit F220. These functions as described above can be implemented by a program executed by a processor unit such as a CPU contained in the input processor unit 1010. These functions configure the packet array send function 30 utilizing the sequence information listed in FIG. 1. The delivery confirmation identifier unit F200 decides whether or not the received packet is a delivery confirmation packet showing it was received by the correct destination, and if the delivery confirmation packet, notifies the sequence information storage unit F140 in the input processor unit 1010. In the sequence information storage unit F140 the notice received from the delivery confirmation identifier unit F200 can be utilized as one condition for deleting sequence information monitored by the sequence information storage unit F140.

The packet array unit F210 searches the times shown in the sequence information attached to the packet, and the arraying process by the packet array unit F210 is skipped in the case that the sequence information was attached earlier than a preset amount of time prior to the current time. In all other cases, the packet array unit F210 delays sending the packets to identical destinations just by an optional time set in advance; and after arraying the packets with the sequence information attached to the packet then sends the packets to their destination. The time information within the sequence information shows the time that the network accepted the packet so that the packets are sent in the order of oldest applicable time. Moreover, the applicable function sends the applicable packets at the timing received, in accordance with the sequence that the packet was accepted. The sequence information invalidation unit F220 is a function to invalidate the sequence information attached at the network, and to validate the sequence information that was invalidated by the network input side of the communication device 10, to restore the status of the packet received by the network.

The NIF controller unit 1000 and the node controller unit 2000 within the communication device 10 each include a time management unit F300. The time management unit F300 in the present embodiment guarantees time equivalence among the communication devices or in other words implements a mechanism to manage a time synchronized among the communication devices within the responsible control range of the service provider.

First of all, the node controller unit 2000 acquires the synchronized time. The node controller unit 2000 for example, acquires the time from a connected GPS device, and synchronizes the time among the adjacent communication devices via IEEE1588 (high precision clock synchronization standard), or acquires a time synchronized from an NTP server.

After acquiring the time, the time management unit F300 in the node controller unit distributes the applicable acquired time in the time management unit F300 of the NIF controller unit 1000 for each of the network interfaces 610-1 through 610-n. If the input processor unit 1010 and the output processor unit 1020 for each of the network interface 610-1 through 610-n also utilize this time information, then the node controller unit' time management unit F300 checks the time in the time management unit F300 of the NIF controller unit 1000 for the applicable network interface 610-1 through 610-n.

Figure 3:
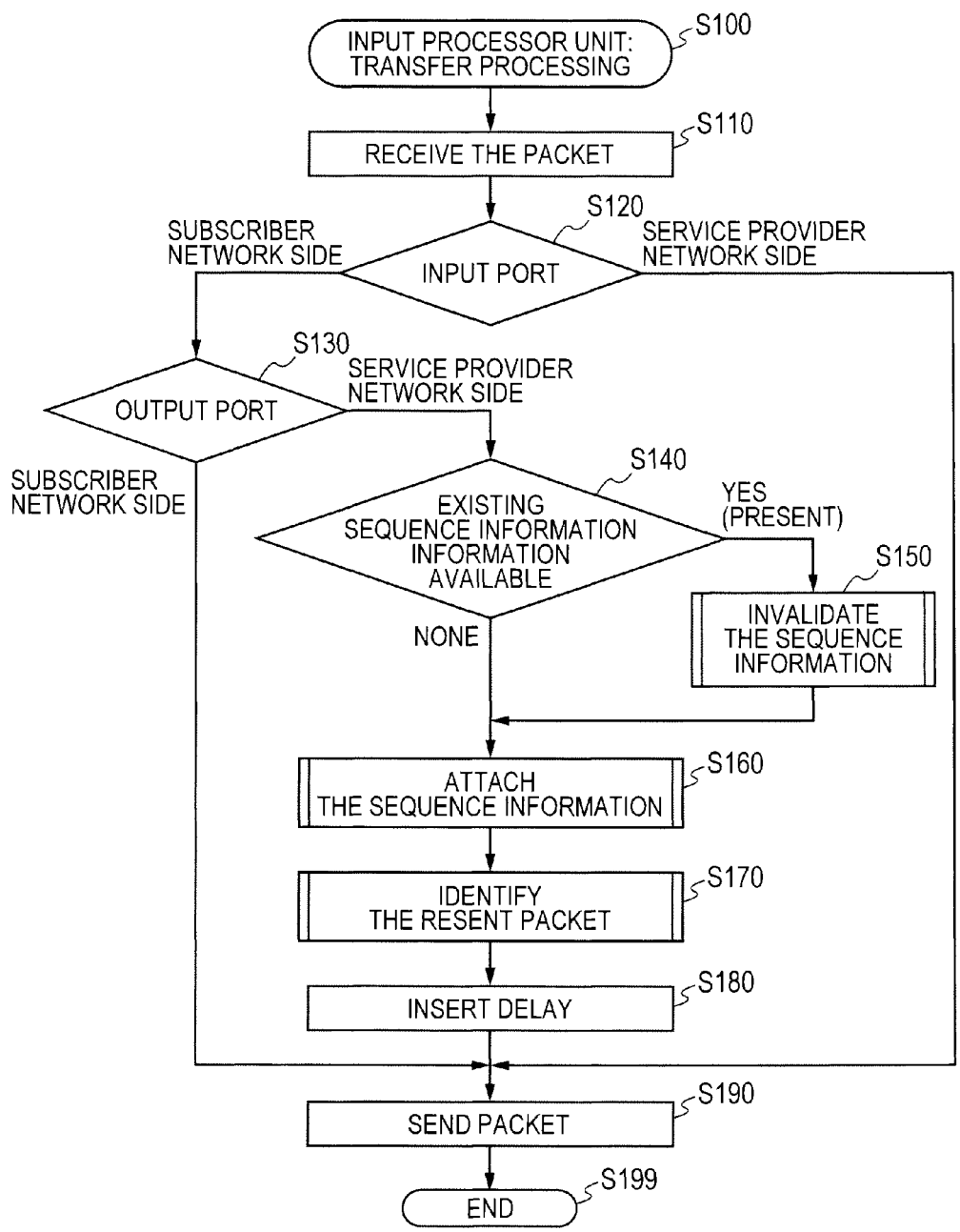
FIG. 3 is a drawing showing one example of the processing flow for packet transfer in the input processor unit of the first embodiment.

FIG. 3 is a drawing showing one example of the processing flow for transferring packets in the input processor unit 1010 of the communication device 10 in the first embodiment shown in FIG. 2 (S100).

First of all, the input processor unit 1010 receives the packet from the packet IF (S110). By checking table information and the source IP address of the received packet pre-stored in the storage unit, the input processor unit 1010 decides if the input port for the received packet is on the subscriber side or the service provider network side (S120). If the input port for the received packet is on the subscriber side, the input processor unit 1010 checks the IP receive source address, and so on, and decides if the transmit destination port of the received packet is on the subscriber side or the service provider network side (S130).

If the input port for the receive packet is on the subscriber side and the transmit destination port is on the service provider network side, then the input processor unit 101 judges that sequence information is already attached to the applicable packet (S140). If the sequence information was already attached then the sequence information invalidation unit F130 executes the sequence information invalidation process (S150). The sequence information attachment unit F110 afterwards attaches the unique network sequence information generated in the sequence information generating unit F150 to the applicable packet (S160). The resent packet identifier unit F120 decides whether the applicable packet is a resent packet or not, and the same session or not (S170).

Executing S160 and S170 in this way on the separate function blocks F110, F120, and selecting whether to validate or invalidate the S170 function, allows easily switching the validating/invalidating function for special processing of the applicable packet. Unifying the S160 and S170 on the other hand allows merging the sequence information attachment functions into one function so that the function can be achieved with minimal resources such as CPU processing capacity, source code capacity, and memory consumption, etc.

Figure 12:
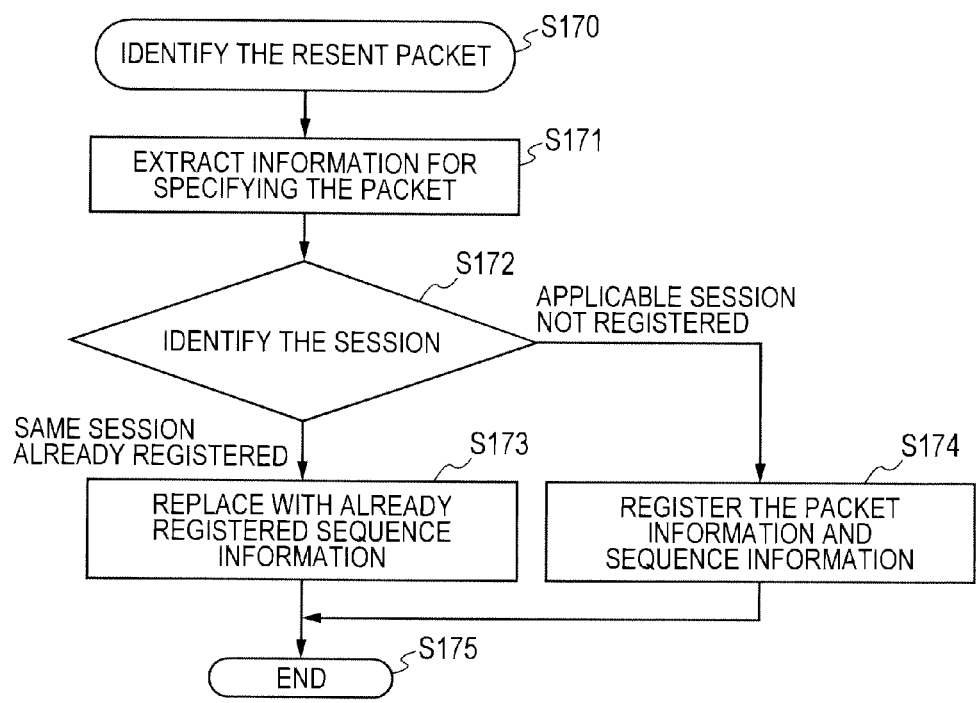
FIG. 12 is a drawing showing one example of the processing flow for identifying the resent packet by the communication device in the first embodiment.

One example of a specific merging method as shown in FIG. 12 is achieved by inserting the special processing implemented in S160, in the session identification S172 as branch processing within the resent packet identification S170, prior to shifting to the process S174. In this branch processing S172, there is no change in the processing during branching to the process S173.

In the processing flow (S170) for the resent packet identification in FIG. 12, information for specifying the applicable packet among the received packets is extracted from the packets (S171). Next, the information held by the sequence information storage unit F140 is searched for information extracted from the applicable packet (S172). If the same session information is already registered, then the applicable packet is judged a resent packet or a packet subsequent to the resent packet, no new registration is performed, and previously registered sequence information is attached to the applicable packet (S173) instead of the currently attached sequence information. If the same session information is not registered, then the information extracted from the packet and the sequence information attached to the applicable packet are linked, registered and stored (S174).

Returning to FIG. 3, if a delay time is specified for the applicable pre-specified destination then the transfer processing for the applicable packet is delayed for just that specified time (S180).

When the present embodiment is applied, the communication device 10 for performing the packet output processing as described later on, temporarily stores the packets sent along plural communication paths into an internal buffer and then arrays the packets. However, when there are many communication paths in the output processing for the destination or when there are large differences in transmission delay between communications paths in the output processing for the destination then a buffer must be provided for temporarily storing a large number of packets for the array processing (i.e. arraying the packets).

Whereupon by delaying the transfer process for the packet by a specified time (S180) in the communication device 10 performing the input processing, or namely by delaying the transfer process by temporarily storing the packet in a provided buffer also within the applicable communication device 10, the buffer capacity required on the output side communication device 10 can be reduced. This arrangement is particularly effective in a network configured with a ratio of many to one where plural communications are concentrated in one point. The applicable packet is sent to the SW IF 602-1 through 602-n according to the destination in order to transfer the packets from the input processor unit 1010 to the switching unit 2100 (S190). The applicable transfer processing is now complete (S199).

Figure 4:
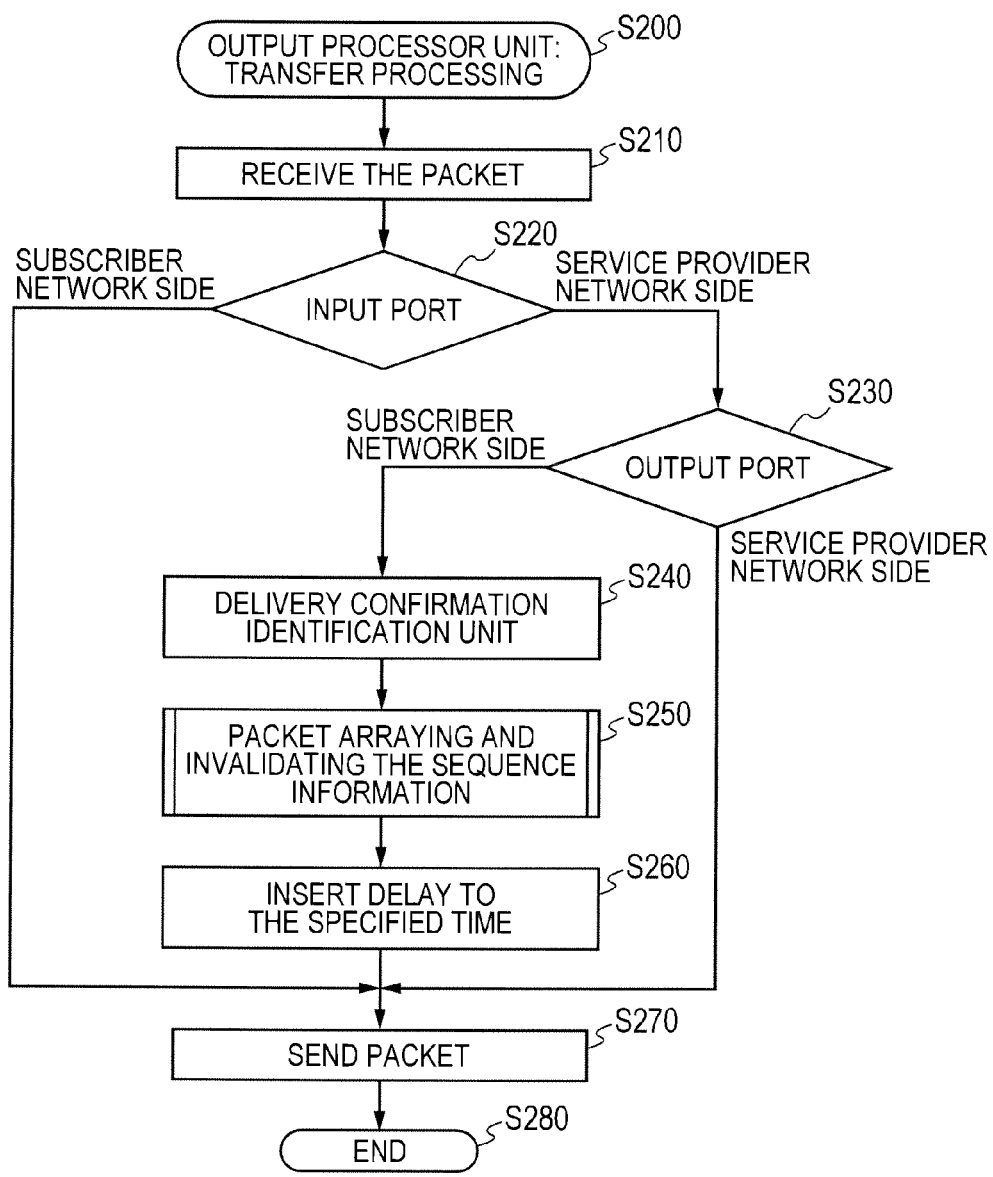
FIG. 4 is a drawing showing one example of the processing flow for packet transfer in the output processor unit in the first embodiment.

FIG. 4 is a drawing showing one example of the processing flow for packet transfer in the output processor unit 1020 (S200) serving as the internal structure of the communication device 10 described in FIG. 2. The output processing unit 1020 receives packets from the SW IF 602-1 through 602-n (S210). A decision is made whether the received packet's input port is the subscriber side or the service provider network side (S220). If the input port for the received packet is on the service provider side, then a decision is made whether the transmit destination port for the received packet is the subscriber side or the service provider network side (S230). Whether the received packet is a delivery confirmed or not is decided, and if delivery-confirmed then the sequence information storage unit F140 is notified (S240). If the input port for the received packet is on the service provider side and the transmit destination port is on the subscriber side, then the packet array unit F210 and the sequence information invalidation unit F220 perform the packet arraying and the sequence information invalidation process (S250). If sequence information was attached by the communication device 10 to the packet showing the received time, then the time for processing the applicable packet in the output processor unit 1020 is a time after the packet arraying and so satisfies the conditional expression (1).

$$t + D\max \leq tn \quad (1)$$

Here, t denotes the packet receiving time, Dmax denotes the maximum value for transmission delay along the plural communication paths linking the applicable packet destination and the transmission source, and tn denotes the current time.

On the other hand, a time showing a future (receiving) time, rather than the time the packet was received at communication device 10 can be attached. In this case, an expression (2) can be utilized to find a time differential Δt versus the current time not satisfying the conditional expression (1).

$$\Delta t = (t + D\max) - tn \quad (2)$$

In this case, the packet transfer processing is delayed just by a Δt time until the applicable time (t+Dmax) (S260). This function allows sending the packet to the subscriber at the time specified by the communication device 10, and allows fair and impartial communication that distributes identical information at an identical time to a plurality of subscribers. The applicable packet is sent to the packet send and receive IF ports 601-1 through 601-n corresponding to the destination in order to transfer the packet from the output processor unit 1020 to the network (S270). The applicable transfer processing now ends (S280).

Figure 5:
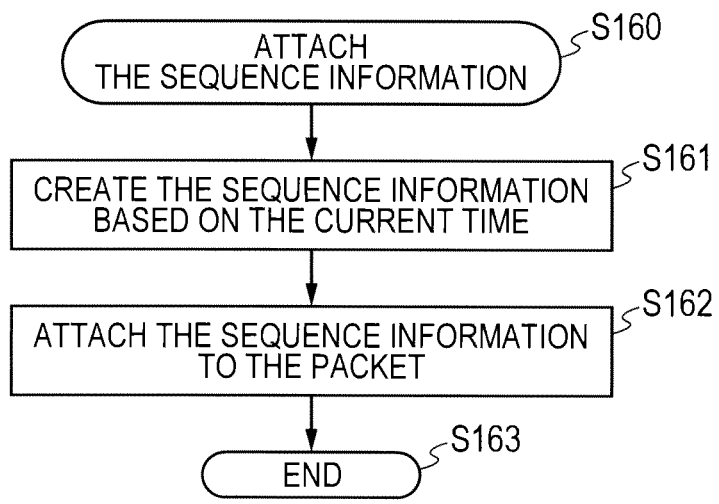
FIG. 5 is a drawing showing one example of the processing flow for attaching the sequence information in the first embodiment.

FIG. 5 is a drawing showing one example of the processing flow for attaching the sequence information at the communication device 10 in the first embodiment (S160). The current time information is acquired from the clock within the communication device 10, and the sequence information is configured (S161). As already described, the sequence information can at this time be configured along with additional information allowing the receiving of plural packets at the same time. The sequence information generated in S161 is inserted at an independently determined packet position to make the applicable sequence information valid (S162). The process for attaching the sequence information then ends (S163).

Figure 6:
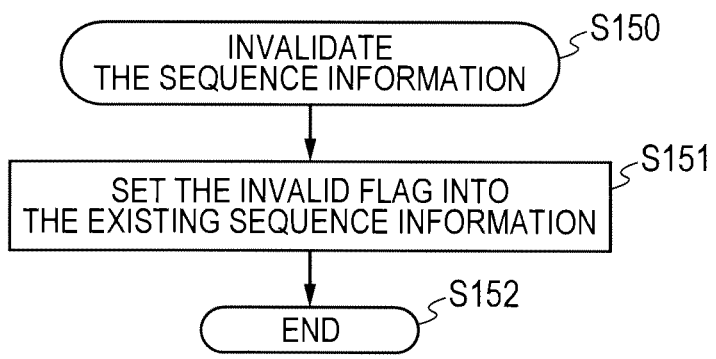
FIG. 6 is a drawing showing one example of the processing flow for invalidating the sequence information in the first embodiment.

FIG. 6 is a drawing showing one example of the processing flow for invalidating the sequence information in the first embodiment (S150). The invalidation technique is applied to invalidate the sequence information that was already attached to the packet (S151). The process for invalidating the sequence information then ends (S152).

Figure 7:
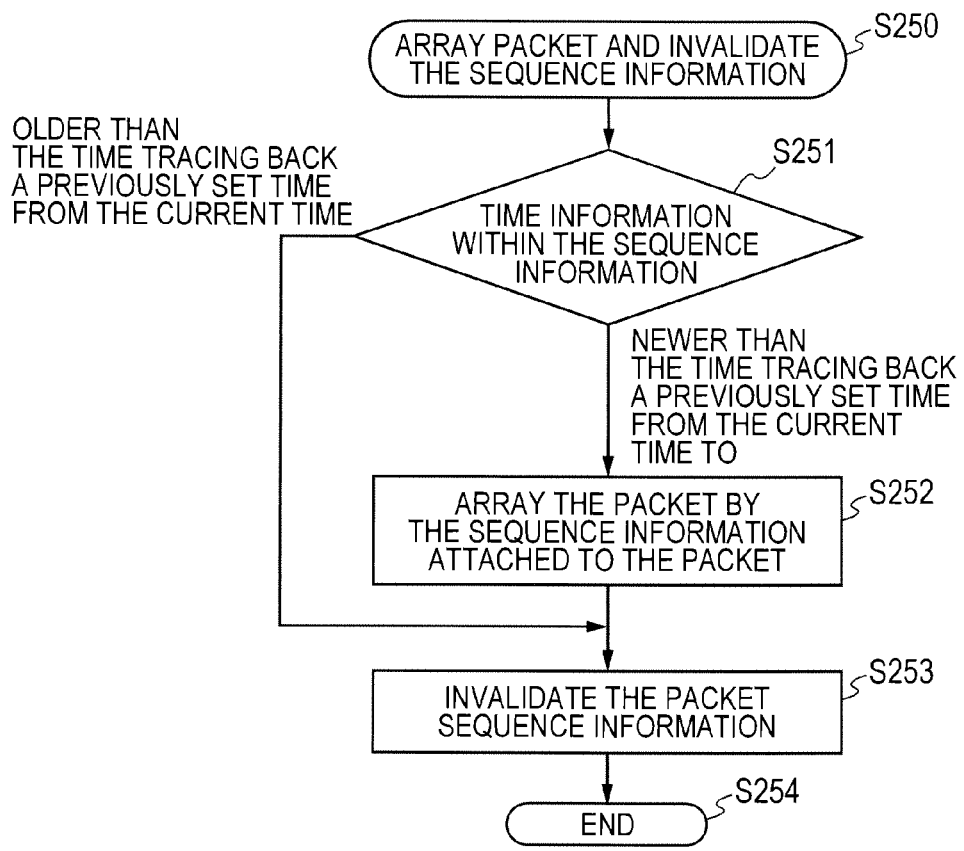
FIG. 7 is a drawing showing one example of the processing flow for arraying the packets and invalidating the sequence information in the first embodiment.

FIG. 7 is a drawing showing one example of the processing flow for arraying the packets and invalidating the sequence information in the first embodiment (S520). When the time shown in the sequence information attached to the packet is T, and the time that the packet was received at the communication device at the destination was Tr, and when the transmission delay between the communication device for the destination and the communication device for the communication source is Δt, and the T shows a past time ever earlier than (Tr−Δt), then the applicable packet is seen as a packet attached with past sequence information in order to resend it, and the packet array process S252 is skipped and processing proceeds to the packet invalidating process S253 (S251). This processing allows skipping the processing that normally requires a specified waiting time to array the packets at the destination communication device and so a resent packet can be sent to the destination faster than other ordinary packets and the delay time occurring due to resending can be reduced. All packets received within a time set beforehand are arrayed in the sequence received at the network according to the sequence information attached to the packet (S252). The sequence information independently attached at the network is invalidated, and if there is sequence information invalidated in S150 then that sequence information is validated and the packet is restored (S253). The processing to array the packets and to invalidate the sequence information now ends (S254).

Figure 8A:
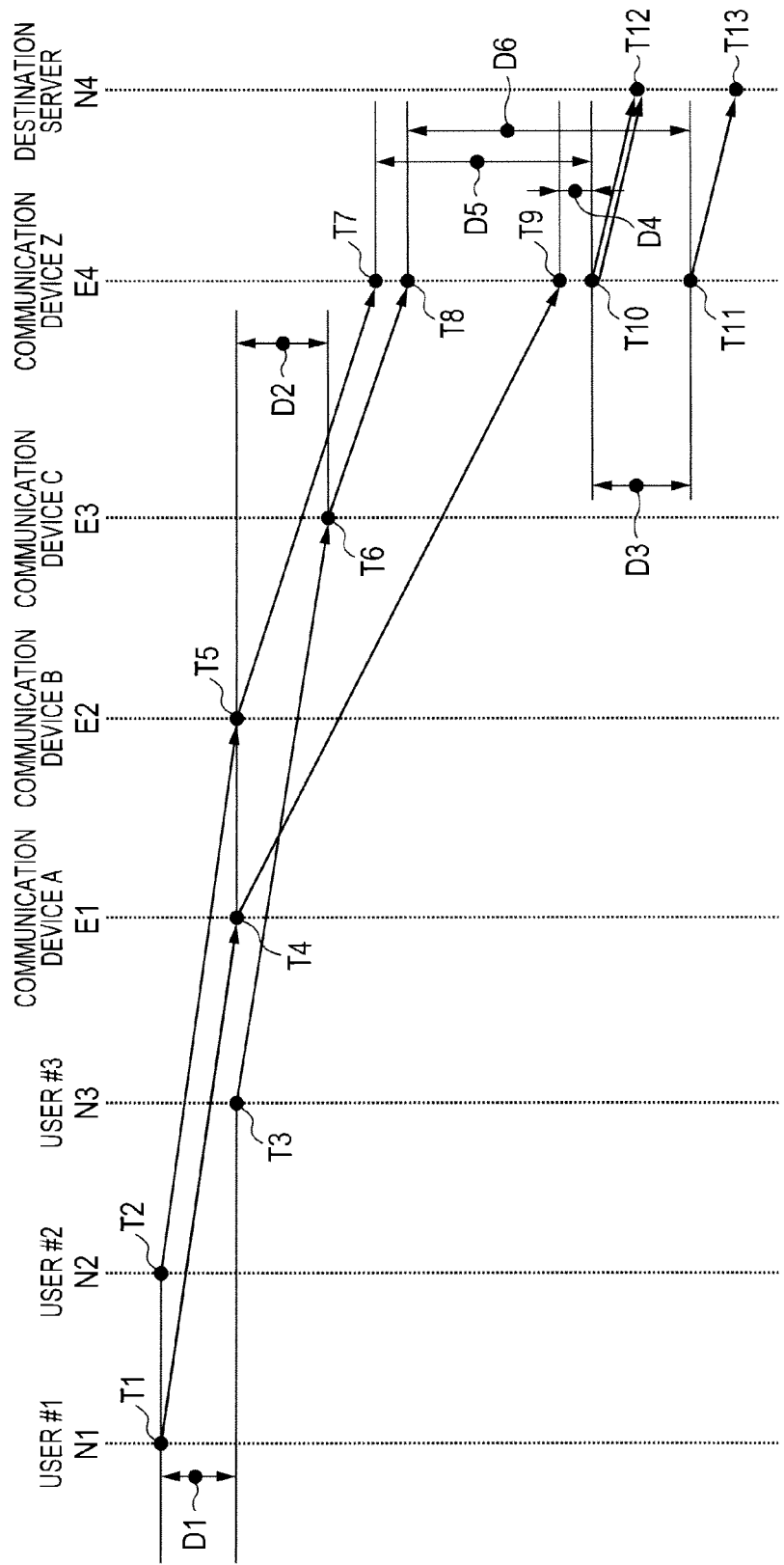
FIG. 8A is a timing chart showing one example of the network providing time equivalence in the first embodiment.

FIG. 8A is a drawing for showing one example of a timing chart for providing the time equivalence to the user by the network system in the first embodiment. FIG. 8A shows at what timing the packets sent by each user arrive by way of a network system at the destination server (N4) in an example of the user #1 (N1), user #2 (N2), and user #3 (N3) utilizing services provided by the destination server (N4) by way of the network system configured from a communication device A (E1), communication device B (E2), communication device C (E3) and communication device Z (E4).

Here, the user #1 (N1) and the user #2 (N2) send a packet towards the destination server (N4) at an identical time (T1 and T2). Next, the user #3 (N3) sends a packet toward the destination server (N4) at a time T3. There is a time differential among T1 and T2 and T3 at this time. The packets sent from the user #1 (N1), user #2 (N2), and user #3 (N3) arrive at the communication device A (E1), communication device B (E2), and communication device C (E3) at the respective times T4, T5, and T6. Each device transfers the received packets to the communication device Z (E4) adjacent to the destination server (N4) which is the packet destination.

The communication device Z (E4) receives the packets sent by the user #1 (N1), user #2 (N2), and user #3 (N3) at the respective times T9, T7, and T8. The communication device Z (E4) sends the packets addressed to the destination server (N4) to the destination after a time delay set beforehand in the network from each source elapses (starting) from the time the packet was received at the network. After receiving each packet, the communication device Z (E4) respectively sends the packet sent by the user #1 (N1) at the time T10 after the D4 time (period), the packet sent by the user #2 (N2) at the time T10 after the D5 time (period), and the packet sent by the user #3 (N3) at the time T11 after the D6 time (period) to the destination server (N4).

The network system of the present embodiment can in this way restore the time differential (D3) of packets sent to the destination server (N4) based on the time differential (D2) that packets arrive at each of devices contained within the network system even if there is a differential (D1) in the time that each user sent the packet.

FIG. 8B shows a timing chart comparison example for the case where there is no function relating to resending described in the present embodiment, when resending occurs in a system where time equivalence is provided to the user in the network system of the present embodiment. In this example, the user sends the next packet after receiving the delivery confirmation packet (Ai_nj) from the destination server. The user #1 (N1) and the user #2 (N2) at this time respectively send three packets (P1_n1, P2_n1, P3_n1, and P1_n2, P2_n2, P3_n2) to the destination server (N3). The destination server receives the P1_n1 and P1_n2 at a time differential (D1).

The packet P2_n1 is lost due to some type of failure before arrival at the destination server. The user #1 therefore resends the P2_n1. The P2_n1 and P2_n2 are consequently received by the destination server at the time differential (D2). The time differential in the time the packets are sent and received between the between the user #1 and user #2, and the destination server caused by resending is then fixed from then onwards.

FIG. 8C shows an example of a timing chart for the case where there is a function relating to resending described in the embodiment, when resending occurs in a system where time equivalence is provided to the user in the network system of the present embodiment. In this example, the user sends the next packet after receiving the delivery confirmation packet (Ai_nj) from the destination server. The user #1 (N1) and the user #2 (N2) at this time respectively send three packets (P1_n1, P2_n1, P3_n1, and P1_n2, P2_n2, P3_n2) to the destination server (N3). The destination server receives the P1_n1 and P1_n2 at a time differential (D1).

The packet P2_n1 is lost due to some type of failure before arrival at the destination server. The user #1 therefore resends the P2_n1. However, the communication device A adjacent to the destination server recognizes the resent packet, and applies sequence information to the packet based on the past time information originally attached to the packet, and the communication device Z recognizes the applicable packet as a resent packet and immediately sends it to the destination server with no wait for arraying the packets. The time differential (D4) for P2_n1 and P2_n2 at the destination server is consequently reduced more than the time differential (D2) in FIG. 8B. Moreover, the resent packet processing for P3_n1 in communication device A and communication device Z continues, and the time differential (D5) for P3_n1 and P3_n2 is reduced even further. The time differential is therefore reduced along with the passage of time and without the fixed period normally used for the time differential that occurred up until now due to resending, occurring among packets sent and received between the user #1 and the user #2.

Figure 9:
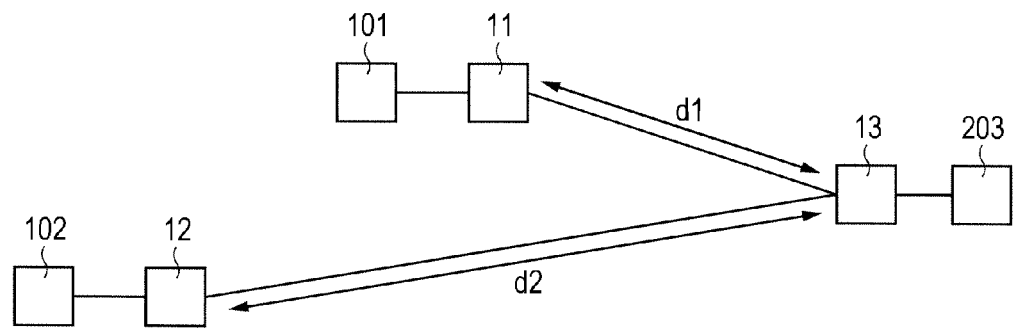
FIG. 9 is a drawing showing a diagram of the section for measuring the transmission delay for calculating each delay time handled by the communication device in the first embodiment.

FIG. 9 is a drawing showing the measurement interval for transmission delay between communications devices used for calculating each type of delay time handled by the communication device of the present embodiment. If the service provided by the server 203 is used by the subscriber on the client terminals 101 and 102, then the service provider establishes communication paths between the communication devices 11-13, and communication devices 12-13 to allow communication during this interval. In that case, the service provider utilizes a test function for monitoring operation of the network provided by the communication device via the monitor terminals to measure the transmission delay along the target communication path. In the example shown in FIG. 9, the transmission delay between the communication devices 11-13 is d1, and the transmission delay between the communication devices 12-13 is d2. The method for calculating the delay time of packets sent from each of the communication device 11 and the communication device 12 and that is set in the communication device 13 is described next.

In the case d2>d1, the delay time D1 inserted by communication device 13 for packets sent from the communication device 11 is calculated by the following expression (3).

$$D1 = d2 - d1 \qquad (3)$$

The delay time D2 inserted by communication device 13 for packets sent from the communication device 12 is calculated by the following expression (4).

$$D2 = 0 \because d2 > d1 \qquad (4)$$

The largest delay time among the delay times on the target communication paths at this time is set as Dmax. Therefore, in this example the communication device 13 transfers the packet to the destination after the packet delay time D1 sent by the communication device 11. The communication device 13 moreover transfers the packet to the destination after the packet delay time D2 sent by the communication device 12, or in other words immediately after receiving the packet. However, the transfer of the packet to the destination by the communication device is for the case where the time information ti within the sequence information of the packet for transfer satisfies the following conditional expression (5).

$$ti + Di \geq tn + D\max \qquad (5)$$

The Di is the delay time inserted in the applicable source i at this time. Here, tn denotes the current time.

If this conditional expression (5) is not satisfied or in other words the sequence information attached to the packet is a future time, then the applicable packet is stored in a buffer within the applicable communication device and transfer to the destination is delayed until the conditional expression (5) is satisfied. By attaching future time information within the sequence information for the packet transferred by the communication device, the communication device can distribute the packet to the destination at a specified time without having to apply a transmission delay. This arrangement allows fair and equal distribution of information to the user of the applicable service simultaneously with the server providing the service.

Figure 10:
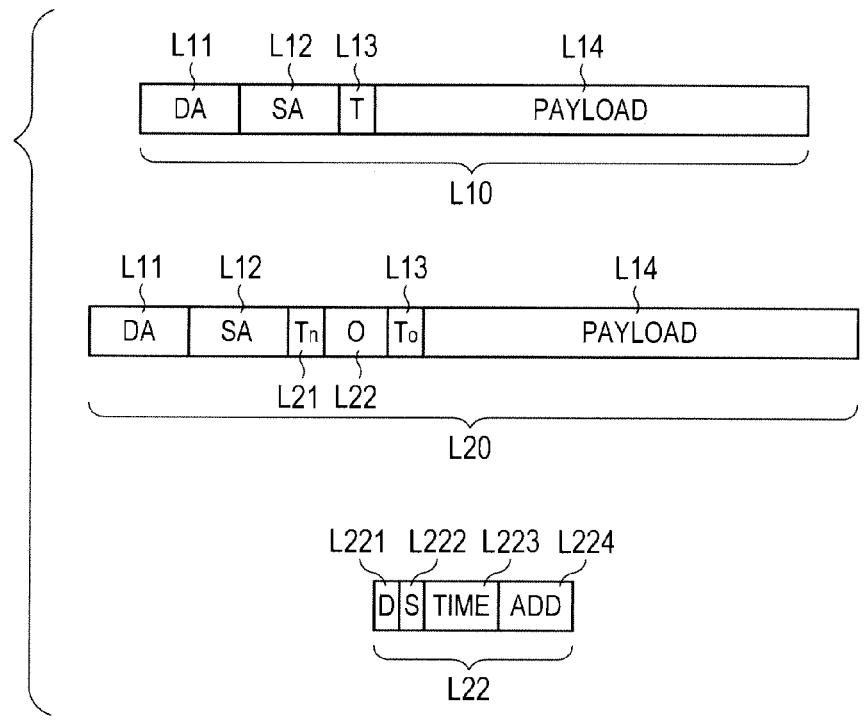
FIG. 10 is drawings showing one example of the layout of each field contained in the packet handled by the communication device in the first embodiment.

FIG. 10 is drawings showing the layout in an example utilizing Ethernet (commercial trademark) frames for each field contained in the packet handled by the communication device in the first embodiment. The standard Ethernet frame L10 as shown in the upper level of this same figure contains a destination address L11, a source address L12, a type value L13 and a payload L14. The communication device 10 that received the Ethernet frame from the subscriber, configures the packet L20 shown in the middle stage of the same figure, inserted with a new type value L21 and sequence information L22 between the type value L13 and the source address L12 of the received packet, and transfers the packet L20 into the network.

If sequence information was already attached to the packet received from the subscriber, then new sequence information is inserted between the new type value L21 and the applicable sequence information L22. Namely, packets retaining sequence information are usually set to a 1 in the field of the new type value L21 shown in the retained sequence information, regardless of the quantity of sequence information that is retained. The new type value L21 utilizes a unique value requests to the IANA (The Internet Assigned Numbers Authority) for monitoring type values.

As shown in the bottom level figure, the sequence information L22 includes an invalidation flag L221, a final sequence information flag L222, a time information L223, and an added information L224. The invalidation flag L221 shows if the network should be searched for the applicable information or should not be searched. When this flag is set, the communication device makes no search of the applicable sequence information when setting the transmit sequence. For the final sequence information flag L222 is an appropriate flag set in the final sequence information that the communication device searches. When the sequence information L22 is attached to the packet, the applicable flag is then set into the sequence information that was first attached. When new sequence information L22 is set into a packet where sequence information was already attached, then no final sequence information flag L222 is set into the sequence information for inserting. The time information L223 shows the time that the communication device received the packet or a future time showing the distribution time of the applicable packet. The added information L224 is information such as a HW clock count attached by the communication device to identify the sequence of packets accepted at the same time.

When the packet L10 is received from the subscriber, the communication device 10 configures the packet L20 attached with sequence information and transfers it to the destination. When the applicable packet is transferred in the network and output from the service provider's network, the communication device 10 removes the sequence information attached when the packet was received by the communication device, and restores the packet L10 when received and outputs it. The packet L10 is in this way restored on the output side of the network by the subscriber so that even utilizing a network providing time equivalence, the subscriber can continue to utilize the service used up to now with no changes whatsoever. When the communication device 10 receives a packet L20 attached with sequence information by the subscriber, an invalidation flag is set for the applicable sequence information, and new sequence information is inserted. When the applicable packet is transferred in the network and output from the service provider network, the communication device removes the sequence information attached when the packet was received, the invalidation flag that was set for the previously attached sequence information is cancelled, and the packet L20 is restored and sent.

There will therefore be no effect on the time equivalence guarantee function provided by the network even if the subscriber carries out communications using sequence information with the same format as the sequence information used within the network, and transparent transfer of the applicable packet is performed. Moreover, during processing by the subscriber or server utilizing sequence information, a selection can be made to transfer the packet without removing the sequence information which is usually removed at the network output port by a service provider setting the applicable communication device. This action prevents falsification of sequence information attached by the subscriber, and sequence information attached by the service provider from outside the network that is impossible to falsify can be referred to so that the server can provide additional services utilizing highly reliable information. Moreover, a selection can be made to transfer the packet unchanged without removing the applicable sequence information even when sequence information was attached based on an attached past time, and not the current time from when the packet was resent.

When the packet received from the subscriber is MPLS frame, then the sequence information L22 attached by the communication device is inserted between the MPLS label and the payload conveyed by the MPLS. The communication device processes the sequence information the same as for the Ethernet, even in cases where the packet received from the subscriber is an MPLS frame.

Figure 11:
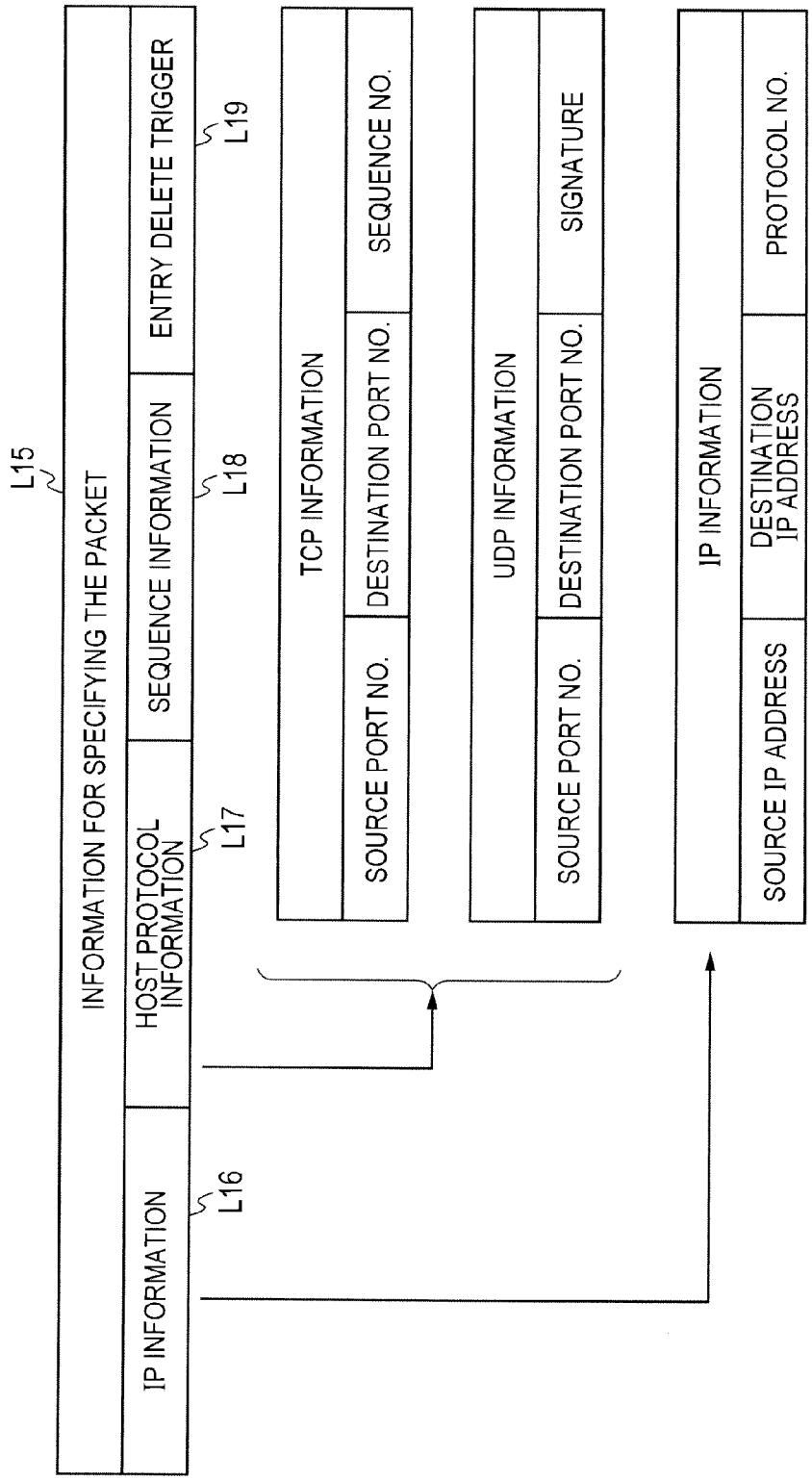
FIG. 11 is a drawing showing one example of the structure for retaining information in order to identify the packet resent packet by the communication device in the first embodiment.

FIG. 11 is a drawing showing one example of the structure of information retained in order for the communication device 10 to identify a resent packet. In the example utilizing an IP protocol, the information L15 for specifying the packet includes the IP information L16, the host protocol information L17 conveyed by the IP packet, the sequence information L18 initially attached to the applicable packet, and the entry delete trigger L19 for the applicable entry. This entry delete trigger L19 can be set according to conditions utilized by the service provider.

Optional conditions where deletion of entries can be specified include: after a specified time set by the system administrator has elapsed (timer); when the transmit byte count set by the system administrator has been reached; when the total number of transmit packets set by the system administrator has been reached; when the timer time or the transmit byte count has been reached; when the timer time or the total number of transmit packets has been reached; when the average number of transmit bytes for all sessions of other users on the same destination server has been reached; when the total number of average transmit packets for all sessions of other users on the same destination server has been reached; and when receiving delivery confirmation when the ACK packet for the TCP has been received, etc.

When the delay time caused by a resent packet can be monitored and assessed beforehand or during operation, then an appropriate (time) period to attach the old sequence information in the applicable session from the shortened delay time on the output side of the service provider network can be specified for the 'after elapsing of specified time (timer) set by system administrator' condition. Also, when the delay time caused by resending a packet in terms of effect on the total number of transmit packets or number of transmit bytes during operation or beforehand can be assessed, then an appropriate period for the old sequence information that must be attached in the applicable session can be specified for the 'when the transmit byte count set by the system administrator has been reached; or when the total number of transmit packets set by the system administrator has been reached' conditions. Utilizing two threshold values allows specifying the appropriate period for attaching old sequence information with a high degree of accuracy in the applicable session rather than individually applying just the timer utilization or transmit bytes or the total number of transmit bytes for the 'when the timer time or the transmit bytes has been reached, and when the timer time or the total number of transmit packets has been reached' condition.

In the 'when the average number of transmit bytes for all sessions of other users on the same destination server; when the total number of average transmit packets for all sessions of other users on the same destination server has been reached;' condition, a judgment can be made not only by the user session that occurred during resending, but also based on other user sessions so that the appropriate period for attaching old sequence information in the applicable session can also be most accurately specified. Conditions for confirming packet delivery can specify attaching old sequence information just to the resent packet.

The IP information L16 includes a source IP address, a destination IP address, and a protocol identifier retained within the IP packet header.

The TCP information taken as one example of the IP information L16 includes a source port number, a destination port number, and a sequence number. Whether the session is the same or not during utilization of TCP/IP can be judged by a match between the IP information and the source port number and the destination port number of the TCP information in order to identify the session. A match among all the IP information and TCP information can be used to judge identical packets during resending.

In another example of the IP information L16, the UDP information is comprised of source port number, a destination port number, and a signature. During utilization of UDP/IP, the UDP header contains no information for specifying the packet, so the MD5 for the UDP packet, hash values such as SHA, the UDP packet length, FCS value for the Ether frame, hash value for the Ether frame, and all contents of the UDP packet and so on can be utilized as a signature serving as auxiliary information for specifying the packet. Managing hash values such as hash values for the UDP packet and hash values for the Ether frame allows reducing the information quantity being retained so that operation can be achieved with a small memory quantity. The UDP packet length and FCS value for the Ether frame do not require performing new processing compared to techniques utilizing hash values so a light processing load can be used. The information quantity being retained can also be reduced the same as when hash values are applied so a small memory quantity can be attained. The quantity of retained information increases due to the overall content of the UDP packet but this arrangement has the advantage that the packet can be specified without error compared to prior and other retaining methods.

The embodiment of the present invention was described with reference to the drawings however the present invention is not limited to the above described embodiment and may include all manner of variations and adaptations. The above embodiments for example were described in detail in order to make the description of the present invention easy to understand however the present invention is not necessarily limited to all of the above structures. Moreover, a portion of the structures of the embodiment may be appended, deleted or substituted with other configurations.

Further, each of the structures, functions, processor units, and processing techniques and so on may also be achieved in whole or in part by dedicated hardware such as designed with integrated circuits, etc. Information such as programs, tables, and files for implementing each of the functions may of course be placed in storage devices such as memories, hard disks, SSD (Solid State Drives) and so on, or storage medium such as IC cards, SD cards, DVD (Digital Versatile Discs), and needless to say, can if necessary be downloaded or installed by way of a network, etc.

What is claimed is:

1. A network system comprising a network connecting a plurality of communication devices,
    wherein a communication device receiving a packet from outside the network is configured to attach sequence information that is time-synchronized with other communication devices of the plurality of communication devices to the packet,
    wherein the communication device sending the packet to outside the network is configured to array and send the packet based on the sequence information attached to the packet, and
    wherein when the packet is resent, the communication device receiving the packet from outside the network is configured to attach sequence information based on a past time already attached to the packet and resend the packet.

2. The network system according to claim 1,
    wherein the communication device sending the packet to outside the network is configured to bypass the array procedure according to the sequence information and send the packet, when the packet to send outside the network was attached with sequence information based on a past time older than a preset specified time.

3. The network system according to claim 1,
    wherein the communication device sending the packet to outside the network is configured to select whether to send the packet without invalidating the sequence information attached to the packet, when bypassing the array processing according to the sequence information and sending the packet, in cases where the packet to send outside the network was attached with sequence information based on past information older than a preset specified time.

4. The network system according to claim 1,
    wherein the communication device receiving the packet from outside the network is configured to invalidate and send the packet attached with existing sequence information.

5. The network system according to claim 1,
    wherein the communication device sending the packet to outside the network is configured to validate the sequence information attached by the communication device receiving the packet from outside the network and send the packet.

6. The network system according to claim 1,
    wherein the communication device receiving the packet from outside the network is configured to send the packet to the network after a specified time delay according to a packet destination.

7. The network system according to claim 1,
    wherein the communication device receiving the packet from outside the network is configured to attach time information based on a time that the packet was received and on additional information as the sequence information.

8. A communication device in a network of mutually connected communication devices, comprising:
- an input processor unit configured to receive a packet from outside the network and attach sequence information that is time-synchronized with other communication devices in the network of the mutually connected communication devices to the packet; and
- an output processor unit configured to array and send the packet to outside the network based on the sequence information attached to the packet by another communication device,
- wherein when the packet is resent, the input processor unit is configured to attach the sequence information based on past time information already attached to the packet.

9. The communication device according to claim 8,
- wherein the input processor unit includes a sequence information storage unit configured to extract information for identifying a session of a subscriber for a packet received from the subscriber, and link and store the information with the sequence information attached to the received packet.

10. The communication device according to claim 9,
- wherein the input processor unit is configured to search the sequence information storage unit with information for identifying the subscriber session in the received packet, and attach the sequence information to the received packet when sequence information was obtained based on a past time retained in the sequence information storage unit.

11. The communication device according to claim 9,
- wherein the sequence information storage unit in the input processor unit is configured to delete information for identifying the subscriber session in compliance with specified conditions that were set beforehand.

12. The communication device according to claim 8,
- wherein when the existing sequence information was attached to the packet received from outside the network, the input processor unit is configured to invalidate the existing sequence information and send the packet to within the network.

13. The communication device according to claim 8,
- wherein after causing a delay just by a specified time, the input processor unit is configured to send the packet received from outside the network to within the network according to a packet destination.

14. The communication device according to claim 8,
- wherein the input processor unit is configured to utilize time information as the sequence information based on a time that the packet was received.

15. The communication device according to claim 8,
- wherein the input processor unit is configured to utilize additional information for identifying a positional relation of packets received at a same time, in addition to the time information, as the sequence information.

\* \* \* \* \*